(12) United States Patent
Yamamoto et al.

(10) Patent No.: US 7,065,441 B2
(45) Date of Patent: Jun. 20, 2006

(54) SHIFT CONTROL SYSTEM AND METHOD FOR V-BELT TYPE CONTINUOUSLY VARIABLE TRANSMISSION

(75) Inventors: Masahiro Yamamoto, Kanagawa (JP); Yoshihisa Kodama, Yokahama (JP); Hiroyasu Tanaka, Kanagawa (JP); Takuichiro Inoue, Kanagawa (JP)

(73) Assignee: JATCO LTD, Fuji (JP)

( * ) Notice: Subject to any disclaimer, the term of this patent is extended or adjusted under 35 U.S.C. 154(b) by 253 days.

(21) Appl. No.: 10/664,031

(22) Filed: Sep. 17, 2003

(65) Prior Publication Data

US 2004/0128046 A1 Jul. 1, 2004

(30) Foreign Application Priority Data

Sep. 20, 2002 (JP) .................................. 2002-275306

(51) Int. Cl.
*G06F 7/00* (2006.01)
*B60K 41/00* (2006.01)

(52) U.S. Cl. ............................. 701/51; 701/52; 701/61; 477/34; 477/37; 477/44; 477/46

(58) Field of Classification Search ................. 701/51, 701/52, 55, 61, 64; 477/34, 37, 44, 47
See application file for complete search history.

(56) References Cited

U.S. PATENT DOCUMENTS

| | | | |
|---|---|---|---|
| 4,698,764 A | 10/1987 | Inagaki et al. | |
| 5,624,349 A | 4/1997 | Yamamoto | |
| 6,336,888 B1 * | 1/2002 | Eguchi | 477/3 |
| 6,776,739 B1 * | 8/2004 | Eguchi et al. | 477/107 |
| 2004/0157700 A1 | 8/2004 | Katou | |

FOREIGN PATENT DOCUMENTS

EP 0 890 764 A2 1/1999
JP 8-178063 A 7/1996

OTHER PUBLICATIONS

U.S. Appl. No. 10/674,069, filed Sep. 30, 2003, Sawada et al.
U.S. Appl. No. 10/674,091, filed Sep. 30, 2003, Jozaki et al.
U.S. Appl. No. 10/670,270, filed Sep. 26, 2003, Nobu.
U.S. Appl. No. 10/670,271, filed Sep. 26, 2003, Nobu.
U.S. Appl. No. 10/662,442, filed Sep. 16, 2003, Ochiai et al.
U.S. Appl. No. 10/670,223, filed Sep. 26, 2003, Wakayama.
U.S. Appl. No. 10/673,549, filed Sep. 30, 2003, Sawada et al.
U.S. Appl. No. 10/670,775, filed Sep. 26, 2003, Shimanaka et al.

* cited by examiner

*Primary Examiner*—Yonel Beaulieu
(74) *Attorney, Agent, or Firm*—Foley & Lardner LLP

(57) ABSTRACT

A shift control system for a V-belt type continuously variable transmission is provided. The shift control system comprises a controller programmed to store an actual transmission ratio of the continuously variable transmission at stop of an associated vehicle drive source, and inhibit, at restart of the vehicle drive source, an initializing operation for returning an operational position of the shift actuator to a standard position when the actual transmission ratio is more on a high-speed side than a predetermined transmission ratio. A shift control method is also provided.

9 Claims, 4 Drawing Sheets

SHIFT CONTROL SYSTEM AND METHOD FOR V-BELT TYPE CONTINUOUSLY VARIABLE TRANSMISSION

BACKGROUND OF THE INVENTION

The present invention relates to a shift control system and method for a V-belt type continuously variable transmission and particularly to a control of a shift actuator at start of an engine, which shift actuator is used in the shift control system for actuating a shift control valve.

Generally, in such a continuously variable transmission, an oil pressure (hereinafter referred to as a primary pulley pressure) that is obtained by regulating a line pressure serving as a base pressure is regulated by means of a shift control valve, is supplied to a primary pulley chamber. The primary pulley pressure is increased or decreased by means of the shift control valve for thereby varying a groove width of the primary pulley. By varying the groove width of the primary pulley, a diameter ratio between the primary pulley and a secondary pulley is varied, thus enabling the transmission ratio of the transmission to vary continuously. The shift control valve is connected to a middle portion of a shift link that constitutes a mechanical feedback mechanism. To the opposite ends of the shift link are connected a movable sheave of the primary pulley and a step motor serving as a shift actuator, respectively. In order to prevent a discrepancy between a rotational position of the step motor that causes the shift control valve to stroke into a position corresponding to a command value for attaining a desired transmission ratio and the command value supplied to the step motor, the step motor is initialized during stop of a vehicle or at start of the engine.

Initialization performed by a conventional system is for causing the command value supplied to the step motor that operates the shift control valve to exactly correspond to the rotational position of the step motor. An example of such initialization is that when an ignition switch is turned on a motor initializing operation means causes the step motor to move in one direction into a hardware limit position and thereafter return to a standard position through movement in the opposite direction. When an initializing operation of the step motor is finished, a motor command value initializing means initializes the motor command value so that the motor command value corresponds to the standard position. By this, the motor command value can exactly corresponds to the rotational position of the step motor and therefore an accurate shift control can be attained (refer to Unexamined Japanese Patent Publication No. 8-178063).

SUMMARY OF THE INVENTION

However, if a vehicle is stopped after rapid deceleration, there is a possibility that the transmission ratio of the automatic transmission cannot return to a low-speed side limit value (max. low value) to which the transmission ratio should return at stop of the engine but the operation of the transmission is stopped with the transmission ratio being held more on the high-speed side than the max. low value.

If the engine is restarted under such a condition and the initialization of the step motor is performed in the usual manner, the step motor is moved in one direction to cause the shift link to turn on the primary pulley that is not positioned at the max. low position and the shift control valve to move in the downshift direction. This causes the primary pulley pressure side to be communicated with a drain side, thus causing the primary pulley pressure to drop. If at this time the driver depresses an accelerator pedal, slippage of the belt occurs due to the insufficient primary pulley pressure, thus possibly lowering the durability of the belt.

It is accordingly an object of the present invention to provide a shift control system and method for a continuously variable transmission that is free from the above noted problem, i.e., that can assuredly prevent slippage of a V-belt at start of an engine and thereby improve the durability of the V-belt.

To achieve the above object, there is provided according to an aspect of the present invention a shift control system for a V-belt type continuously variable transmission having a primary pulley, a secondary pulley, a V-belt wound around the primary pulley and the secondary pulley, and a shift actuator for variably controlling V-shaped groove widths of the primary pulley and the secondary pulley through variable control of a difference between a primary pulley pressure and a secondary pulley pressure so that an actual transmission ratio attained by a rotational speed ratio between the primary pulley and the secondary pulley becomes equal to a target transmission ratio corresponding to an operational position of the shift actuator, the shift control system comprises a controller programmed to store an actual transmission ratio of the continuously variable transmission at stop of an associated vehicle drive source, and inhibit, at restart of the vehicle drive source, an initializing operation for returning an operational position of the shift actuator to a standard position when the actual transmission ratio is more on a high-speed side than a predetermined transmission ratio.

According to another aspect of the present invention, there is provided a shift control method for a V-belt type continuously variable transmission having a primary pulley, a secondary pulley, a V-belt wound around the primary pulley and the secondary pulley, and a shift actuator for variably controlling V-shaped groove widths of the primary pulley and the secondary pulley through variable control of a difference between a primary pulley pressure and a secondary pulley pressure so that an actual transmission ratio attained by a rotational speed ratio between the primary pulley and the secondary pulley becomes equal to a target transmission ratio corresponding to an operational position of the shift actuator, the shift control method comprises storing an actual transmission ratio of the continuously variable transmission at stop of an associated vehicle drive source, and inhibiting, at restart of the vehicle drive source, an initializing operation for returning an operational position of the shift actuator to a standard position when the actual transmission ratio is more on a high-speed side than a predetermined transmission ratio.

DESCRIPTION OF THE PREFERRED EMBODIMENT

Figure 1:
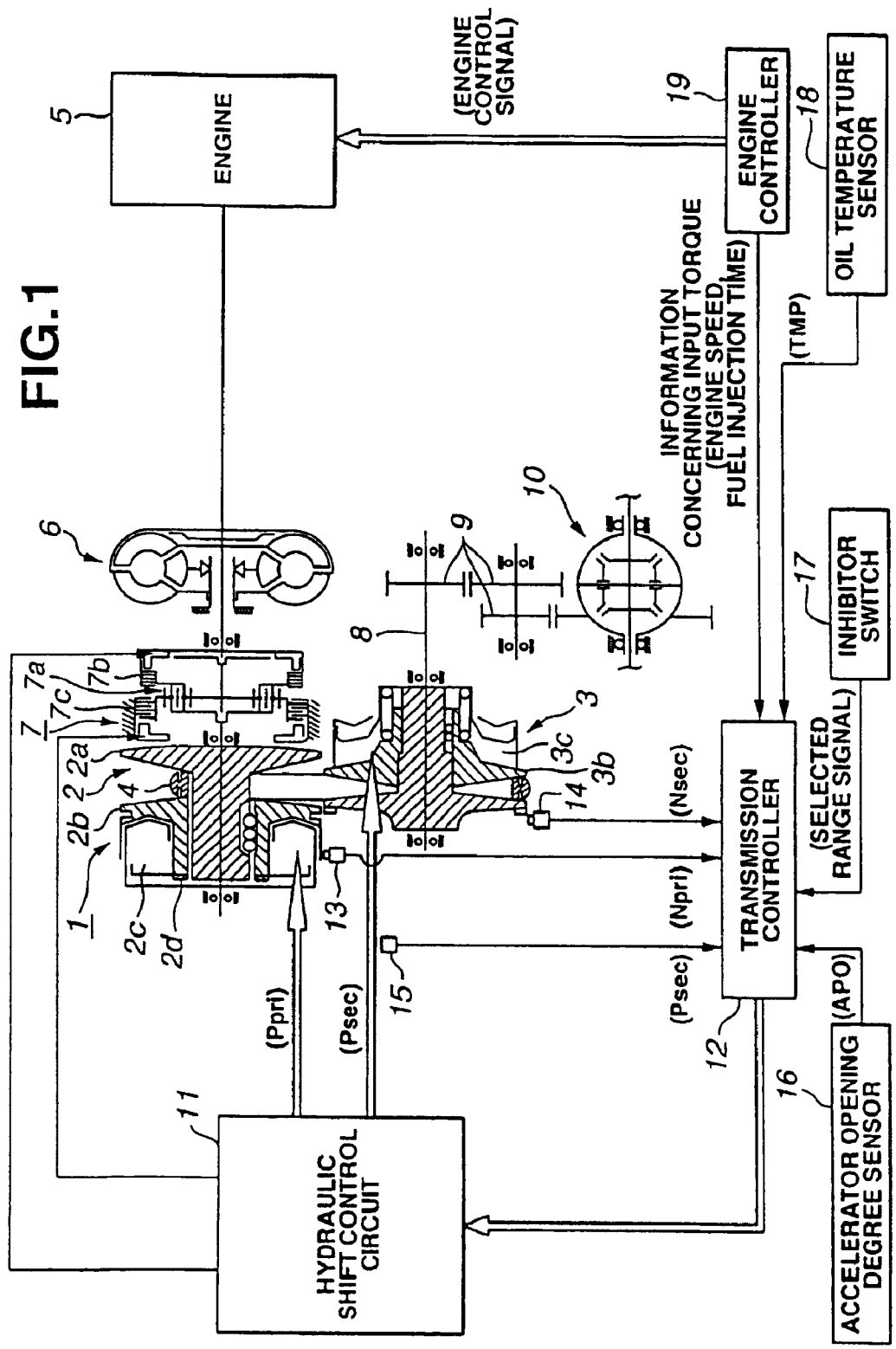
FIG. 1 is a schematic view of a shift control system for use with a V-belt type continuously variable transmission according to an embodiment of the present invention.

Referring first to FIG. 1, a V-belt type continuously variable transmission is generally indicated by 1 and includes a primary pulley 2 and a secondary pulley 3 that are disposed so as to have V-shaped grooves (no numeral) arranged in line. Around the V-shaped grooves of the pulleys 2, 3 is wound a V-belt 4. An engine 5 that serves as a vehicle drive source is disposed coaxially with the primary pulley 2. Between the engine 5 and the primary pulley 2 are disposed in order from the engine 5 side a lockup torque converter 6 and a forward/backward switching mechanism 7.

The forward/backward switching mechanism 7 includes as a major component a double pinion planetary gear assembly 7a with a sun gear (no numeral) being connected to the engine 5 by way of a torque converter 6 and a carrier (no numeral) being connected to the primary pulley 2. The forward/backward switching mechanism 7 further includes a forward clutch 7b directly connecting between the sun gear and the carrier and a backward brake 7c for fixing a ring gear (no numeral) of the double pinion planetary gear assembly 7a. The forward/backward switching mechanism 7 transmits, upon engagement of the forward clutch 7b, an input rotation transmitted thereto from the engine 5 by way of the torque converter 6 to the primary pulley 2 as it is and upon engagement of the backward clutch 7c, to the primary pulley 2 while changing the rotational direction of the input rotation and reducing the rotational speed of the same.

Rotation of the primary pulley 2 is transmitted to the secondary pulley 3 by way of the V-belt 4. Rotation of the secondary pulley 3 is thereafter transmitted to vehicle wheels (not shown) by way of an output shaft 8, a gear train 9 and a differential gear assembly 10. In order that a transmission ratio (transmission ratio) between the primary pulley 2 and the secondary pulley 3 can be varied during the above-described transmission of power, sheaves of the primary pulley 2 and the secondary pulley 3 that define the V-shaped grooves include fixed sheaves 2a, 3a and movable sheaves 2b, 3b that are movable in the axial direction. The movable sheaves 2b, 3b are urged against the respective fixed sheaves 2a, 3a by a primary pulley pressure Ppri and a secondary pulley pressure Psec that are produced by using the line pressure that is controlled in the manner as will be described in detail later, as a base pressure and supplied a primary pulley chamber 2c and a secondary pulley chamber 3c. By this, the V-belt 4 is frictionally engaged with the sheaves 2a, 2b, 3a, 3b of the pulleys 2, 3 so as to enable the above-described transmission of power between the primary pulley 2 and the secondary pulley 3. In the meantime, particularly in this embodiment, the pressure receiving areas of the primary pulley chamber 2c and the secondary pulley chamber 3c are made the same, thus not causing one of the pulleys 2, 3 to be larger in diameter and thereby enabling the V-belt type continuously variable transmission to be compact in size.

Upon shifting, a target transmission ratio can be realized by varying the V-shaped groove widths of the primary and secondary pulleys 2, 3 by the difference between the primary pulley pressure Ppri and the secondary pulley pressure Psec that are produced so as to correspond to a target transmission ratio as will be described later and thereby varying radii of circular arcs along which the V-belt 4 is wound around the pulleys 2, 3.

The output of the primary pulley pressure Ppri and the secondary pulley pressure Psec is controlled by a hydraulic shift control circuit 11 together with the output of oil pressure for engaging a forward brake 7b upon selection of a forward running range and the output of oil pressure for engaging a backward brake 7c upon selection of a backward running range. The hydraulic control circuit 11 executes the above-described control in response to the signal from the transmission controller 12. To this end, inputted to the transmission controller 12 are a signal from a primary pulley rotation sensor 13 for detecting a primary pulley rotational speed Npri, a signal from a secondary pulley rotation sensor 14 for detecting a secondary pulley rotational speed Nsec, a signal from a secondary pulley pressure sensor 15 for detecting a secondary pulley pressure Psec, a signal from an accelerator opening degree sensor 16 for detecting an accelerator pedal depression amount APO, a selected range signal from an inhibitor switch 17, a signal from an oil temperature sensor 18 for detecting a transmission working oil temperature TMP, and a signal from an engine controller 19 for controlling the engine 5 (engine speed and fuel injection time).

Figure 2:
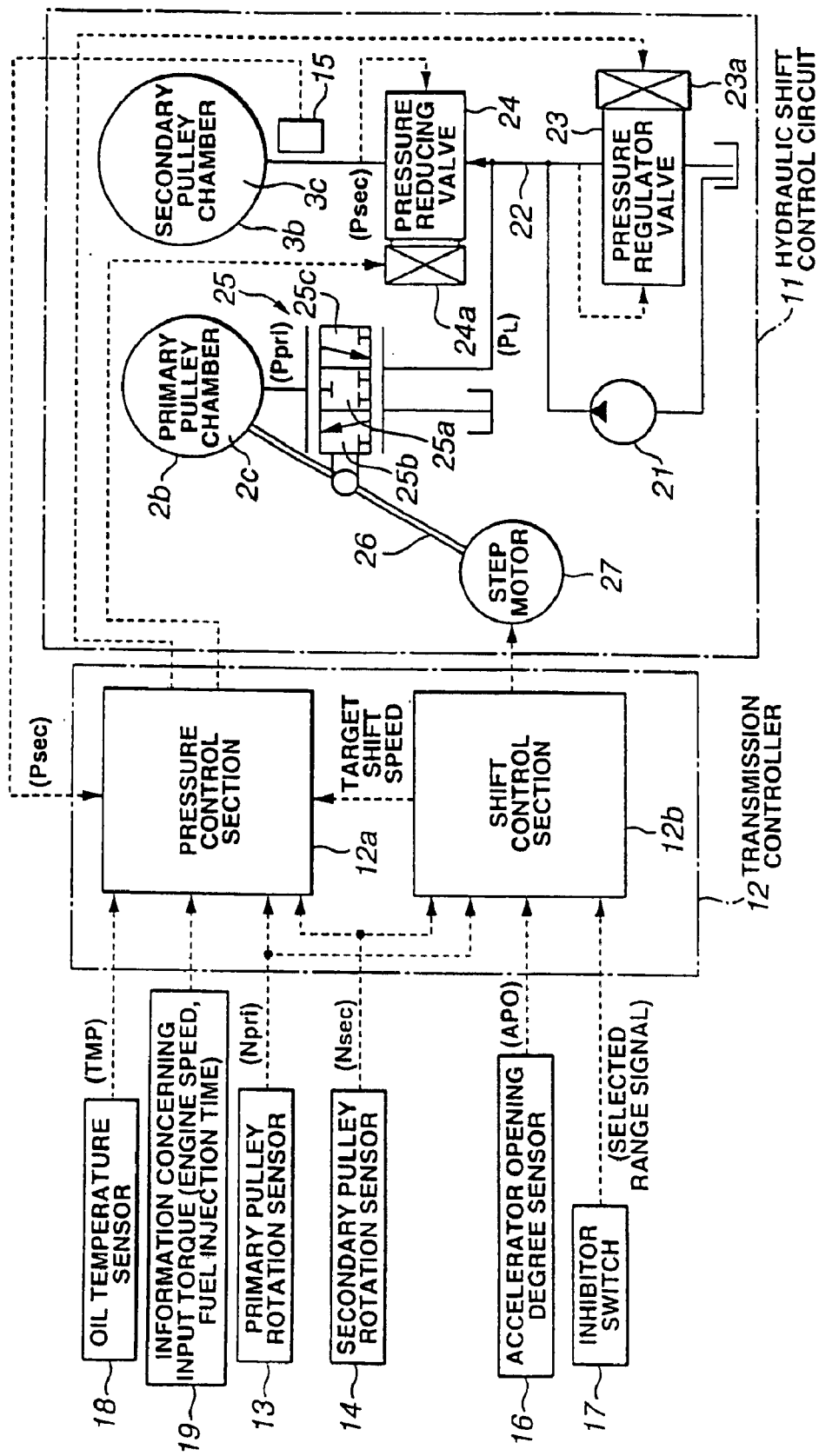
FIG. 2 is a block diagram showing the details of the shift control system of FIG. 1.

The hydraulic shift control circuit 11 and the transmission controller 12 are structured as diagrammatically shown in FIG. 2. Firstly, the hydraulic shift control circuit 11 will be described. The hydraulic shift control circuit 11 is provided with an oil pump 21 that is driven by the engine 5. The working oil supplied from the oil pump 21 to an oil passage 22 is used as a medium and the pressure of the working oil is regulated by a pressure regulator valve 23 to a predetermined line pressure $P_L$. The line pressure $P_L$ of the oil passage 22 is regulated on one hand to a secondary pulley pressure Psec by means of a pressure reducing valve 24 and supplied to the secondary pulley chamber 3c and regulated on the other hand to a primary pulley pressure Ppri by means of a shift control valve 25 and supplied to the primary pulley chamber 2c. In the meantime, the pressure regulator valve 23 controls the line pressure $P_L$ in accordance with a drive duty of a solenoid 23a, and the pressure reducing valve 24 controls the secondary pulley pressure Psec in accordance with a drive duty of a solenoid 24a.

The shift control valve 25 has a neutral position 25a, a pressure increasing position 25b and a pressure reducing position 25c. To change the valve position, the shift control valve 25 is connected to a middle portion of a shift link 26 which is in turn connected at an end thereof with a step motor 27 serving as a shift actuator and at the other end thereof with the movable sheave 2b of the primary pulley 2. The step motor 27 is driven from the standard position into an operational position advanced by a step number Astep corresponding to a target transmission ratio. By such an operation of the step motor 27, the shift link 26 is caused to oscillate about a connecting portion at which it is connected to the movable sheave 2b and thereby the shift control valve 25 is caused to vary in the valve position from the neutral position 25a to the pressure increasing position 25b or the pressure reducing position 25c. As a result, in case the target transmission ratio is on a high-speed side (upshift side), the line pressure $P_L$ side is communicated with the primary pulley pressure Ppri side. On the other hand, in case the target transmission ratio is on the low-speed side (downshift side), the primary pulley pressure side is communicated with the drain side. By this, the primary pulley pressure Ppri is increased by the line pressure PL serving as a base pressure or reduced by being drained, thus causing a variation in the difference between the primary pulley pressure Ppri and the secondary pulley pressure Psec and causing upshift to the high-speed side transmission ratio or downshift to the low-speed side transmission ratio for thereby performing a shifting operation toward the target transmission ratio.

Progress of such shifting is fed back to the corresponding end of the shift link 26 by way of the movable flange 2c of the primary pulley 2, and the shift link 26 is caused to oscillate about the connecting portion at which it is connected to the step motor 27, thus causing the shift control valve 25 to return from the pressure increasing position 25b or the pressure reducing position 25c to the neutral position 25a. By this, the shift control valve 25 is returned to the neutral position 25a at the time the target transmission ratio is attained, thus making it possible to keep the target transmission ratio. In the meantime, in case the primary pulley 2 is at a position where it is in contact with a mechanical stopper 2d, the mechanical stopper 2d is adapted to apply a reaction force to the primary pulley 2 so that a capacity of a V-belt transmission torque is retained.

The solenoid drive duty of the pressure regulator valve 23, the solenoid drive duty of the pressure reducing valve 24 and the shift command to the step motor 27 (drive step number Astep) are determined by the transmission controller 12 together with the control of whether oil pressure is supplied to the forward clutch 7b and the backward clutch 7c shown in FIG. 1 for engagement thereof. The transmission controller 12 is made up of a pressure control section 12a and a shift control section 12b as shown in FIG. 2. The pressure control section 12a determines the solenoid drive duty of the pressure regulator valve 23 and the solenoid drive duty of the pressure reducing valve 24. The shift control section 12b determines the drive step number Astep of the step motor 27 so as to attain a gear ratio ranging from a max. low gear ratio to a max. high gear ratio in the following manner. In the meantime, the max. low gear ratio (i.e., second predetermined transmission ratio) is smaller (i.e., more on the high-speed side) than the gear ratio (i.e., first predetermined transmission ration) that is attained when the movable sheave 2b of the primary pulley 2 is in contact with a stopper 2d of the V-belt type continuously variable transmission 1 (refer to FIG. 1).

Namely, the shift control section 12b firstly finds a target transmission ratio corresponding to a driving condition (vehicle speed and accelerator pedal depression amount APO) by finding a target rotational input speed based on a predetermined shift map and by using a vehicle speed that can be found from the secondary pulley rotational speed Nsec and the accelerator pedal depression amount APO, and dividing the target input rotational speed by the secondary pulley rotational speed Nsec. Then, the actual transmission ratio (transmission ratio reached) is calculated by dividing the primary pulley rotational speed Npri by the secondary pulley rotational speed Nsec, and it is found a shift command for allowing the actual transmission ratio to get gradually closer to the target transmission ratio at the target shift speed while compensating for a disturbance according to a deviation of the actual transmission ratio with respect to the above-described target transmission ratio. Then, the step number Astep of the step motor 27 (the operational position of the step motor 27) for realizing the shift command is found and supplied to the step motor 27. By this, the target transmission ratio can be by the above-described shifting operation.

Figure 3:
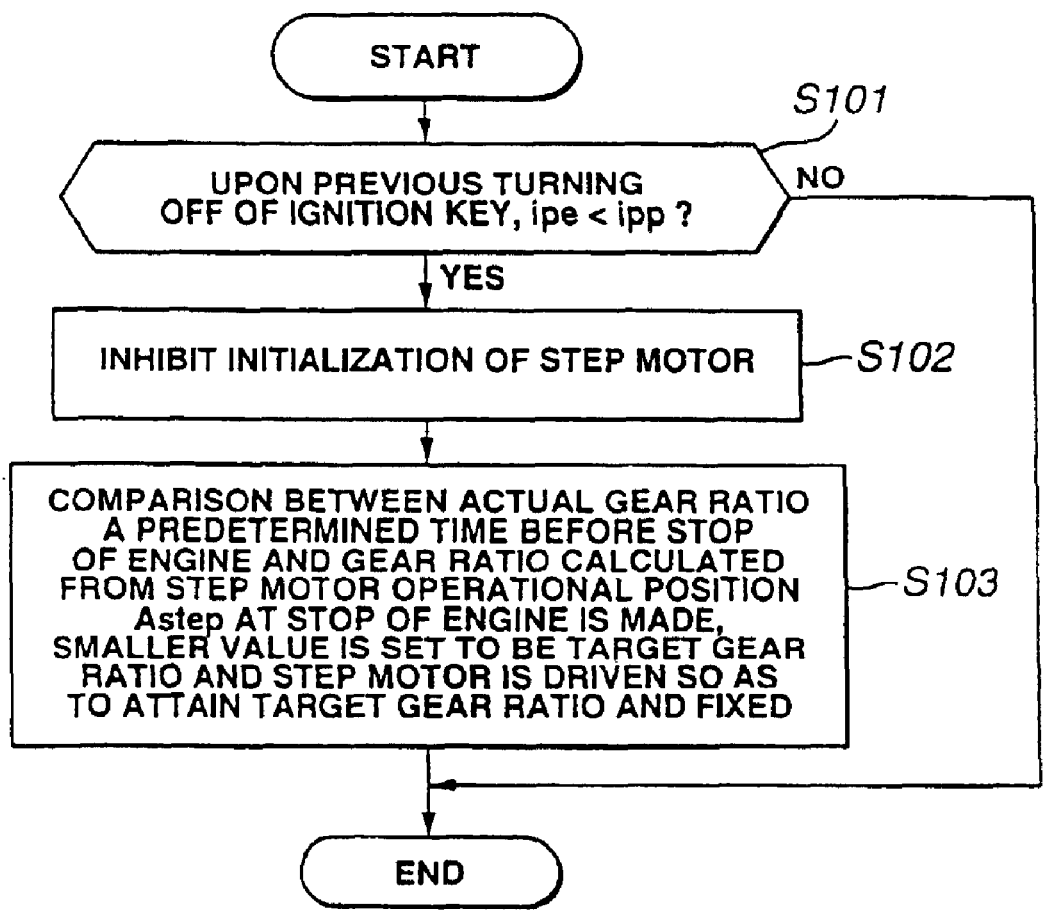
FIG. 3 is a flowchart of a control process at start of an engine that is executed by the control system of FIG. 1.

Generally, at start of the engine 5, the step motor 27 is initialized. The initialization is generally performed by driving the step motor 27 toward the low-speed side, i.e., the downshift side. In contrast to this, according to the present invention, in order to prevent slip of the V-belt 4 due to the initialization performed when the transmission ratio at stop of an engine is more on the high-speed side than a proper transmission ratio as described herein before, a process based on a control routine shown in FIG. 3 is performed at start of the engine 5. The control routine will be described in the following.

Firstly, before performing the routine, the transmission controller 25 stores beforehand the actual transmission ratio at stop of the engine 5, i.e., the value ipe of the transmission ratio obtained from the speed Npri of the primary pulley 2 and the speed Nsec of the secondary pulley 3 at stop of the engine 5.

In step S101, the transmission ratio ipe stored beforehand at previous stop of the engine 5 is read and is compared with a predetermined value ipp. If ipe is larger than the predetermined value ipp, i.e., more on the low-speed side, the process is ended and usual initialization of the step motor 27 is performed. On the other hand, if ipe is smaller than the predetermined value ipp, i.e., more on the high-speed side, the program proceeds to step S102. In the meantime, the predetermined value ipp is for example set in the following manner. In the V-belt type continuously variable transmission 1, even when the transmission ratio does not return to the max. low ratio at stop of the engine 5, it is actually returned to the max. low ratio if it ranges from the max. low ratio to a predetermined gear ratio due to the fact that an oil pressure produced by the oil pump 21 at restart of the engine 5 flows into the secondary pulley chamber 3c at a dash and resultantly causes the movable sheave 2b of the primary pulley 2 to move into the position where the movable sheave 2b is in contact with the mechanical stopper 2d. Thus, a minimum (high-speed side ratio) of transmission ratios that allow the movable sheave 2b of the primary pulley 2 to move into the position where the movable sheave 2b is in contact with the mechanical stopper 2d due to the oil pressure produced at restart of the engine 5 is found experimentally, and the predetermined value ipp is set at a value nearly equal to the minimum of the transmission ratio with consideration of an error.

In step s102, initialization of the step motor 27 is inhibited, and in next step 103 the actual transmission ratio a predetermined time (e.g., 100 msec) before stop of the engine 5 is compared with the transmission ratio corresponding to the operational position Astep at stop of the engine 5 and a smaller value (high-speed side) is set to be a target transmission ratio and the step motor is driven into the position corresponding to the target transmission ratio and fixed thereat and then the program is ended.

Figure 4:
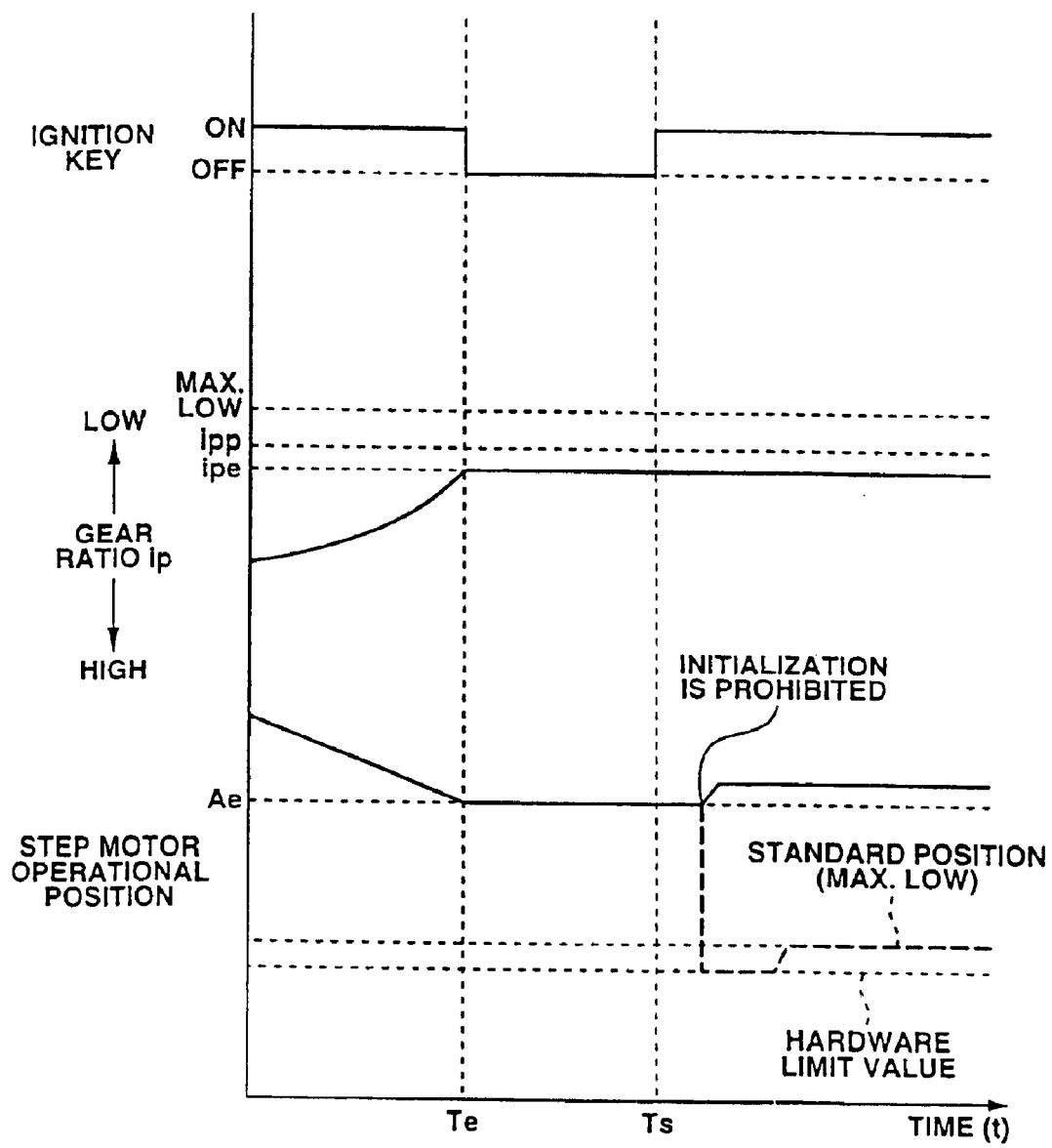
FIG. 4 is a time chart of variations of a transmission ratio and a step motor operational position resulting when the control process of FIG. 3 is executed.

FIG. 4 is a time chart showing time variations of the ignition key ON/OFF operation, the transmission ratio ip and the step motor step number (operational position) Astep.

Usually, when, as described above, the vehicle is decelerated and stopped and then the engine 5 is stopped, the transmission 1 is operated so as to return the transmission ratio ip to the max. low ratio. However, when the vehicle is stopped after rapid deceleration and the engine 5 is stopped, there can possibly occur such a case in which the transmission 1 is stopped with the transmission ratio ip that cannot return to the max. low ratio but is held in a state of ipe.

Thus, according to the present invention, the transmission ratio ipe at stop of the engine 5 is compared with a predetermined transmission ratio ipp, and when ipe is more on the high-speed side than ipp, the control process shown in FIG. 3 is executed. In FIG. 4, since ipe is more on the high-speed side than ipp, the control process of FIG. 3 is executed.

When the engine 5 is restarted at the time Ts, initialization of the step motor 27 is usually performed for thereby causing the step motor operational position Astep to move to the hardware limit value once as indicated by the dotted line and thereafter move to the standard position (max. low position).

However, since in this instance the transmission ratio ipp is of the value ipe that is more on the high-speed side than the max. low value and further than the value ipe that is more on the high-speed side than ipe, the step motor operational position Astep is of the value Ae corresponding to ipe. When usual initialization is performed under this condition, there is a possibility of causing slippage of the belt 4, that is, the step motor 27 is moved in one direction to cause the shift link 26 to turn on the primary pulley 2 that is not positioned at the max. low position and the shift control valve 25 to move in the downshift direction. This causes the primary pulley pressure Ppri side to be communicated with a drain side, thus causing the primary pulley pressure Ppri to drop. If at this time the driver depresses the accelerator pedal (not shown), slippage of the belt 4 occurs due to the insufficient primary pulley pressure Ppri, thus possibly lowering the durability of the belt 4. Thus, initialization of the step motor 27 is not performed but a comparison between the actual transmission ratio a predetermined time (e.g., 100 msec) before stop of the engine 5 and the actual transmission ratio corresponding to the step motor operational position Astep at stop of the engine 5 is made and smaller one is set to be a target transmission ratio. In this instance, the actual transmission ratio a predetermined time before stop of the engine 5 is usually smaller, so that the step motor 27 is driven in the upshift direction and is fixed at the position corresponding to the target transmission ratio. As a result, the line pressure $P_L$ side and the primary pulley pressure Ppri side are communicated with each other, thus preventing the primary pulley pressure Ppri from reducing. Further, the transmission ratio ip is fixed at ipe since the vehicle is not moving.

As having been described above, in the shift control system for the continuously variable transmission 1, the transmission ratio at stop of the engine 5 is stored beforehand, and when the transmission ratio is more on the high-speed side than a predetermined value at restart of the engine 5, initialization of the shift actuator 27 is not performed. By this, the shift actuator 27 is not moved in the downshift direction by an initializing operation at restart of the engine 5, and reduction of the primary pulley pressure Ppri accompanied by the initializing operation can be prevented. Thus, even when the transmission 1 is stopped with a transmission ratio more on the high-speed side than a predetermined transmission ratio, it becomes possible to prevent the durability of the belt 4 from being lowered due to occurrence of slippage of the belt 4 that is caused by the insufficient primary pressure Ppri. Further, in case the transmission ratio is more on the low-speed side than the predetermined transmission ratio at restart of the vehicle drive source, an initializing operation is assured. Thus, the initializing operation is not inhibited excessively but it becomes possible to make it as fewer as possible to perform a control under the condition where there is a difference between the operational position of the shift actuator 27 and the command position and it becomes possible to prevent the fuel consumption from being lowered.

Further, the actual transmission ratio a predetermined time before stop of the engine 5 and the shift actuator operational position Astep are stored beforehand. A comparison between the actual transmission ratio a predetermined time before stop of the engine 5 and the transmission ratio corresponding to the shift actuator operational position Astep at stop of the engine 5 is made at restart of the engine 5. High-speed side one of the transmission ratios is set to be a target transmission ratio and the shift actuator 27 is operated so as to attain the target transmission ratio. Thus, in case the initializing operation is inhibited at restart after stop of the engine 5, the shift actuator 27 is usually caused to maintain the operational position Astep at stop of the engine 5 or driven in the upshift direction. As a result, the operation of the shift actuator 27 in the downshift direction is inhibited assuredly, thus making it possible to prevent slippage of the belt 4 due to reduction of the primary pulley pressure Ppri assuredly. Further, by setting the predetermined transmission ratio ipp at a value nearly equal to the minimum of the transmission ratios that allow the movable sheave 2b of the primary pulley 2 to move into the position where the movable sheave 2b is in contact with the mechanical stopper 2d, the more suitable control can be attained.

The entire contents of Japanese Patent Applications P2002-275306(filed Sep. 20, 2002) are incorporated herein by reference.

Although the invention has been described above by reference to a certain embodiment of the invention, the invention is not limited to the embodiment described above. Modifications and variations of the embodiment described above will occur to those skilled in the art, in light of the above teachings. For example, judgment on initialization of the step motor 27 is made based on the comparison between the predetermined value ipp and the transmission ratio at stop of the engine 5 that is calculated from the primary pulley rotational speed Npri and the secondary pulley rotational speed Nsec, this is not for the purpose of limitation. Namely, the "term transmission ratio at stop of engine" may encompass an actual transmission ratio or a target transmission ratio a predetermined time before stop of the engine 5. Further, while the engine 5 has been described shown as a vehicle drive source, this is not for the purpose of limitation but can be replaced by a motor/generator. The scope of the invention is defined with reference to the following claims.

What is claimed is:

1. A shift control system for a V-belt type continuously variable transmission having a primary pulley, a secondary pulley, a V-belt wound around the primary pulley and the secondary pulley, and a shift actuator for variably controlling V-shaped groove widths of the primary pulley and the secondary pulley through variable control of a difference between a primary pulley pressure and a secondary pulley pressure so that an actual transmission ratio attained by a rotational speed ratio between the primary pulley and the secondary pulley becomes equal to a target transmission ratio corresponding to an operational position of the shift actuator, the shift control system comprises a controller programmed to:

store an actual transmission ratio of the continuously variable transmission at stop of an associated vehicle drive source; and inhibit, at restart of the vehicle drive source, an initializing operation for returning an operational position of the shift actuator to a standard position when the actual transmission ratio is more on a high-speed side than a predetermined transmission ratio.

2. A shift control system according to claim 1, wherein the controller is further programmed to:

store an operational position of the shift actuator at stop of the vehicle drive source;

store an actual transmission ratio a predetermined time before stop of the vehicle drive source; and compare a transmission ratio corresponding to the stored operational position of the shift actuator and the stored actual transmission ratio the predetermined time before stop of the vehicle drive source, set one of the compared transmission ratios that is more on a high-speed side to be a target transmission ratio and operate the shift actuator so as to attain the set target transmission ratio.

3. A shift control system according to claim 1, wherein the V-belt type continuously variable transmission has a stopper brought into contact with a movable sheave of the primary pulley when a predetermined transmission ratio is attained and thereby preventing a transmission ratio from becoming further larger, and the controller is further programmed to set the first-mentioned predetermined transmission ratio at a value nearly equal to a minimum of transmission ratios that allow the movable sheave of the primary pulley to move into a position where the movable sheave of the primary pulley is in contact with the stopper due to an oil pressure that is produced at restart of the vehicle drive source.

4. A shift control system for a V-belt type continuously variable transmission having a primary pulley, a secondary pulley, a V-belt wound around the primary pulley and the secondary pulley, and a shift actuator for variably controlling V-shaped groove widths of the primary pulley and the secondary pulley through variable control of a difference between a primary pulley pressure and a secondary pulley pressure so that an actual transmission ratio attained by a rotational speed ratio between the primary pulley and the secondary pulley becomes equal to a target transmission ratio corresponding to an operational position of the shift actuator, the control system comprises:

means for storing a transmission ratio of the continuously variable transmission at stop of an associated vehicle drive source;

means for determining whether the transmission ratio at stop of the associated vehicle drive source is more on a high-speed side than a predetermined transmission ratio; and means for inhibiting, at restart of the vehicle drive source, an initializing operation for returning an operational position of the shift actuator to a standard position when the transmission ratio at stop of the associated vehicle drive source is more on a high-speed side than the predetermined transmission ratio.

5. A shift control system according to claim 4, wherein the transmission ratio at stop of the vehicle drive source is an actual gear ratio at stop of the vehicle drive source.

6. A shift control system according to claim 4, further comprising:

shift actuator operational position storing means for storing an operational position of the shift actuator at stop of the vehicle drive source;

actual transmission ratio storing means for storing an actual transmission ratio a predetermined time before stop of the vehicle drive source; and means for comparing a transmission ratio corresponding to the stored operational position of the shift actuator and the stored actual transmission ratio the predetermined time before stop of the vehicle drive source, setting one of the compared transmission ratios that is more on a high-speed side to be a target transmission ratio and operating the shift actuator so as to attain the set target transmission ratio.

7. A shift control system according to claim 4, wherein the V-belt type continuously variable transmission has a stopper brought into contact with a movable sheave of the primary pulley when a second predetermined transmission ratio is attained and thereby preventing a transmission ratio from becoming further larger, the shift control system further comprising means for setting the first-mentioned predetermined transmission ratio at a value nearly equal to a minimum of transmission ratios that allow the movable sheave of the primary pulley to move into a position where the movable sheave of the primary pulley is in contact with the stopper due to an oil pressure that is produced at restart of the vehicle drive source.

8. A shift control method for a V-belt type continuously variable transmission having a primary pulley, a secondary pulley, a V-belt wound around the primary pulley and the secondary pulley, and a shift actuator for variably controlling V-shaped groove widths of the primary pulley and the secondary pulley through variable control of a difference between a primary pulley pressure and a secondary pulley pressure so that an actual transmission ratio attained by a rotational speed ratio between the primary pulley and the secondary pulley becomes equal to a target transmission ratio corresponding to an operational position of the shift actuator, the shift control method comprises:

storing an actual transmission ratio of the continuously variable transmission at stop of an associated vehicle drive source; and inhibiting, at restart of the vehicle drive source, an initializing operation for returning an operational position of the shift actuator to a standard position when the actual transmission ratio is more on a high-speed side than a predetermined transmission ratio.

9. A shift control method according to claim 8, further comprises storing an operational position of the shift actuator at stop of the vehicle drive source;

storing an actual transmission ratio a predetermined time before stop of the vehicle drive source; and comparing a transmission ratio corresponding to the stored operational position of the shift actuator and the stored actual transmission ratio the predetermined time before stop of the vehicle drive source, setting one of the compared transmission ratios that is more on a high-speed side to be the target transmission ratio and operating the shift actuator so as to attain the set target transmission ratio.

* * * * *